United States Patent [19]

Tamamori

[11] Patent Number: 4,917,148
[45] Date of Patent: Apr. 17, 1990

[54] LOAD DEPENDENT VALVE FOR RAILWAY VEHICLES

[75] Inventor: Hideo Tamamori, Kita, Japan

[73] Assignee: Nippon Air Brake Co., Ltd., Kobe, Japan

[21] Appl. No.: 278,387

[22] Filed: Dec. 1, 1988

[30] Foreign Application Priority Data

Dec. 29, 1987 [JP] Japan .................................. 62-201557

[51] Int. Cl.$^4$ ..................... G05D 16/00; F16K 31/126
[52] U.S. Cl. ............................ 137/596.18; 137/627.5; 137/85
[58] Field of Search .................. 137/596.18, 627.5, 85, 137/116.3; 303/40

[56] References Cited

U.S. PATENT DOCUMENTS

| | | | |
|---|---|---|---|
| 2,958,337 | 11/1960 | Holbrook | 137/85 X |
| 3,018,136 | 1/1900 | Williams | 137/102 X |
| 4,480,663 | 11/1984 | Bergemann | 137/627.5 |
| 4,724,859 | 2/1988 | Nakao | 137/116.5 |

Primary Examiner—Alan Cohan
Attorney, Agent, or Firm—J. B. Sotak

[57] ABSTRACT

A load dependent valve for railway cars including first and second springs, each having one end contacting a balance piston. A first spring adjusting mechanism for adjusting the compressive force of the first spring and a second spring adjusting mechanism for adjusting the compressive force of the second spring. A valve seat disposed in an air supply passage which is connected between an air supply chamber and an output chamber. An air supply valve is biased to seat on the valve seat. An exhaust valve rod having a valve tip facing the air supply valve and fitting the air supply passage and has an exhaust air bore, one end opens at the valve tip and the other end opens at the exhaust chamber. The control piston including a control piston diaphragm fixed to the main valve body and fixed to the control piston. The balance piston includes a balance piston diaphragm which is fixed to the main valve body and also is fixed to the balance piston main body. A plurality of first fins fixed around the piston main body on the low pressure side along the direction of movement facing its upper edges to the diaphragm of the same piston, while the side opposite to that receiving the air pressure of at least one piston of the two pistons is set at a pressure lower than the minimum value of the air pressure. A plurality of second fins located in the main valve body and placed between the first fins, and in which the first surface which connects the upper edges of the first fins on the side of the diaphragm intersects with the second surface which connects the upper edges of the second fins on the side of the diaphragm.

6 Claims, 3 Drawing Sheets

LOAD DEPENDENT VALVE FOR RAILWAY VEHICLES

FIELD OF THE INVENTION

This invention relates to a load dependent valve for use in air brake systems for railway cars and controls the output air pressure corresponding to the air spring pressure.

BACKGROUND OF THE INVENTION

A load dependent valve of this type is shown and described in Japanese Patent No. 59-26506 which is used for adjusting the applied brake force in accordance with the weight of the car which is dependent upon the number of passengers in the car with pneumatic suspension. The detailed description of the structure and operation will now be explained with reference to FIGS. 4 and 5 of the present application. As shown in FIG. 4, an inlet port 16 is connected to a suitable source of air pressure via conduit or line 16a. It will be seen that an outlet port 17 is connected to the brake cylinders via line 17a. It will be noted that a pair of inlet ports 18 and 19 are connected to a pair of separate air springs via lines 18a and 19a, respectively. The effective area of the control piston 4 is effectively twice as large as the effective area of the control piston 5. The two air spring pressures which are supplied to the air spring connection inlet ports 18 and 19 are averaged. A connecting rod 3 is attached to the pistons 4 and 5 and the upper end of the connecting rod 3 is arranged to contact the underside of a lower pivotal lever 7. The fixed end of the lower lever 7 is pivotally mounted on the main body of the load dependent valve so that it can rotate freely, and an adjustable biasing spring 10 exerts a force on the upper side of the other free end of the lever 7. The lower side of an exhaust valve rod 1 is cooperatively associated with a balance piston 2, and the lower end of the rod 1 contacts the upper side of an upper pivotal lever 6. As shown, the fixed end of the upper lever 6 is also pivotally mounted on the main body load dependent valve so that it can rotate freely, and an adjustable biasing spring 9 exerts a force on the underside of the other free end of the lever 6. The biasing spring 9 is adapted to maintain the brake pressure of the empty car when the air spring pressure PX becomes lower than the preset empty car pressure PA as noted in FIG. 5 when the air spring is damaged or for some other reason. This can be adjusted by an adjusting screw 11. The basing spring 10 is to allow the brake pressure to rise when the air spring pressure PX becomes higher than the pressure PN of the empty car. This can be adjusted by the second screw 12. A roller member 8 is sandwiched between the lower lever 6 and the upper lever 7, and it can be moved in a right or left direction from outside of the valve by any appropriate means. When roller 8 is moved to the left, the necessary force to move the air spring pressure upwardly is increased, and when the roller 8 is moved to the right, the force is decreased. In other words, the more the roller 8 moves to the left, the steeper the slope becomes between the empty car and the full car shown in FIG. 5.

When the air spring pressure PX becomes lower than the preset empty car pressure PN as a result of damage to the load dependent valve or for some other unknown reason, the second biasing spring 10 overcomes the air spring pressure acting on the control pistons 4 and 5 and the lower lever 7 and the connecting rod 3 to move downwardly, and the first biasing spring 9 acts on the exhaust valve rod 1 via the upper lever 6 completely independent of the air spring pressure so that the preset empty car brake pressure PC is obtained from the output 17.

When the air spring pressure PX is lower than the empty car pressure PN, the air spring pressure which acts on the control pistons 4 and 5 cannot push the second lever 7 upwardly against the force of the second spring 10. However, when the pressure becomes higher than the preset empty car pressure PN, the air spring pressure acting on the control pistons 4 and 5 overcomes the second biasing spring 10 and pushes the connecting rod 3 and the lower lever 7 upwardly. It also pushes the exhaust valve rod 1 via the roller 8 and the first lever 6 upwardly. When the exhaust valve rod rises, the air supply valve 13 also rises, so that the air supply hole 15 opens, and the compressed air is conveyed from the inlet port 16 which is connected to the air source to the outlet port 17 so that the output pressure increases. Then, the pressure acting on the top of the balance piston 2 also increases, and when it balances with the force acting from the lower direction on the exhaust valve rod 1, the air supply valve 13 and the exhaust valve rod 1 move down at the same time by the action of the return spring, and the air supply inlet 15 is closed.

When the air spring pressure PX decreases because of passengers getting off the train, the force acting on the exhaust valve rod 1 through the control pistons 4 and 5, the connecting rod 3, the lower lever 7, the roller 8, and the upper lever 6 also decreases. Thus, the exhaust valve rod 1 is pushed downwardly by the output pressure acting on the balance piston 2 so that the exhaust port 14 opens and the air in the outlet 17 is exhausted.

When the output pressure PY decreases, the pressure which acts on the balance piston 2 also decreases so that when it becomes slightly less than the force acting on the lower side the exhaust valve rod 1 is again pushed upwardly and contacts the air supply valve 13 wherein the exhaust outlet 14 is closed. Thus, as can be seen in FIG. 5, an output pressure PY which is proportional to the air spring pressure PX can be obtained, and the minimum brake force of the empty car can be maintained even if the air spring is defective and the air spring pressure decreases abnormally.

FIG. 5 is a graphic illustration of the characteristics of the output air pressure PY, the pressure at the outlet 17, in relation to the air spring pressure PX of the load dependent valve. As shown in FIG. 5. PN is the air spring pressure of the empty car, and the output air pressure PY is kept constant PC even if the air spring pressure PX becomes lower than this PN and the output air pressure rises with the specified slope adjusted by the roller 8 when it becomes larger than PN.

As described above, in the present load dependent valve, the slope can be changed, as shown by the phantom lines in FIG. 5, by varying the lever ratio which is dependent upon the position of the roller 8 so that the subject load dependent valve can correspond to the various condition of the car in which the weight of the car, air spring, and the required deceleration are different.

In the previous load dependent valve, the minimum output air pressure P and the empty car air spring pressure PN can be preset by adjusting the force of the first biasing spring 9 and the second biasing spring 10, and the characteristic of the output air pressure PY in relation to the air spring pressure PX can be changed by moving the position of the roller 8. However, the position of the levers and piston shifts during operation because of the slope of the first and the second levers 6 and 7 so that it is difficult to transmit the force accurately. Moreover, the contacting point of the roller 8 and the contacting lever portion are subject to wear, and therefore, the output air pressure is different from the initial output air pressure for a specified air spring pressure even if the roller is positioned at the same place after it has been in use for a long time. Accordingly, the sensitivity as well as the response capability becomes degraded.

OBJECTS AND SUMMARY OF THE INVENTION

Therefore, it is an object of this invention to obtain a structure in which the characteristic of the output air pressure to the air spring pressure can be changed without using a mechanical roller and lever arrangement. Another object of this invention is to provide a new and improved load dependent valve for railway vehicles.

The following type of pressure control valve for a railway car was previously described in a copending U.S. application Ser. No. 07/278,388, filed on Dec. 1, 1988 by the applicant of this invention. In particular, the air supply valve, the air supply port and the valve seat as shown in FIG. 4, are formed on the middle body member. It will be seen that the position on this middle body member can be adjusted in the direction of movement of the exhaust valve rod, and at the same time, the structure below the balance piston is one in which one or both of the balance and control pistons have first fins without using the lever and/or roller mechanisms, and also, there are second fins provided on the side of the valve main body corresponding to the position between the first fins, so that the effective area ratio of the balance piston and the control piston can be changed by changing the contact situation between the fins and the diaphragm by adjusting the position of the middle body member.

In accordance with the present invention there is a load dependent valve comprising a first spring having one end of which contacts a balance piston, and the other end of which is supported by the main valve body via a first spring retainer which extends through the center part of the control piston.

A second spring having one end of which is supported by the balance piston and the other end is supported by the control piston via the second spring retainer. A first spring adjusting mechanism located between the first spring retainer and the main valve body side in order to adjust the compression force of the first spring. A second spring adjusting mechanism located between the second spring retainer and control piston in order to adjust the compression force of the second spring. The first spring acts on the balance piston which receives an output air pressure PY which opposes the compression force. If the air spring pressure namely, the control air pressure PX is 0, the output air pressure PY on the balance piston compensates for the compression force of the first spring. The magnitude of the compression force of the first spring can be adjusted by the first spring adjusting mechanism. Thus, the output air pressure PY does not become lower than the minimum air pressure PC, since adjusting it the output air pressure PY becomes the minimum air pressure PC required for the brake cylinder when the air spring pressure PX is 0. In other words, the minimum output air pressure PC can be set by adjusting the first spring.

The second spring functions to open the distance between the balance piston and the control piston, and when its force is small it is compressed even if the air spring pressure, namely, the control air pressure PX is small. The balance piston contacts the control piston, and the control force is transmitted to the balance piston. However, if the compression force of the second spring is increased, the force of the second spring acts on the balance piston with the control piston reaching the end when the air spring pressure PX is small. Thus, this force balances so that the output air pressure acts on the balance piston. The force of the second spring can be adjusted by the second spring adjusting mechanism so that the control piston does not change position until the air spring pressure PX exceeds the empty car air spring pressure PN. Thus, the output air pressure does not change. Thus, the force of the second spring is adjusted so that the control piston separates when the air spring pressure PX exceeds the empty car air spring pressure PN. In other words, the empty car air spring pressure PN can be preset by adjusting the second spring.

Basically, in this load dependent valve, the effective area ratio of the balance piston and the control piston can be changed by adjusting the position of the middle body member, so that the characteristic of the output air pressure in relation to the air spring pressure, in particular the slope of the graph in FIG. 5, can be changed. Therefore, changing the position of the middle body member is almost equivalent to changing the lever ratio by changing the position of the roller in the load dependent valve as shown in FIG. 4.

DESCRIPTION OF THE DRAWINGS

The above objects and other attendant features and advantages will be more readily appreciated as te present invention becomes better understood by reference to the following detailed description when considered in conjunction with the accompanying drawings, wherein.

DETAILED DESCRIPTION OF THE INVENTION

Figure 1:
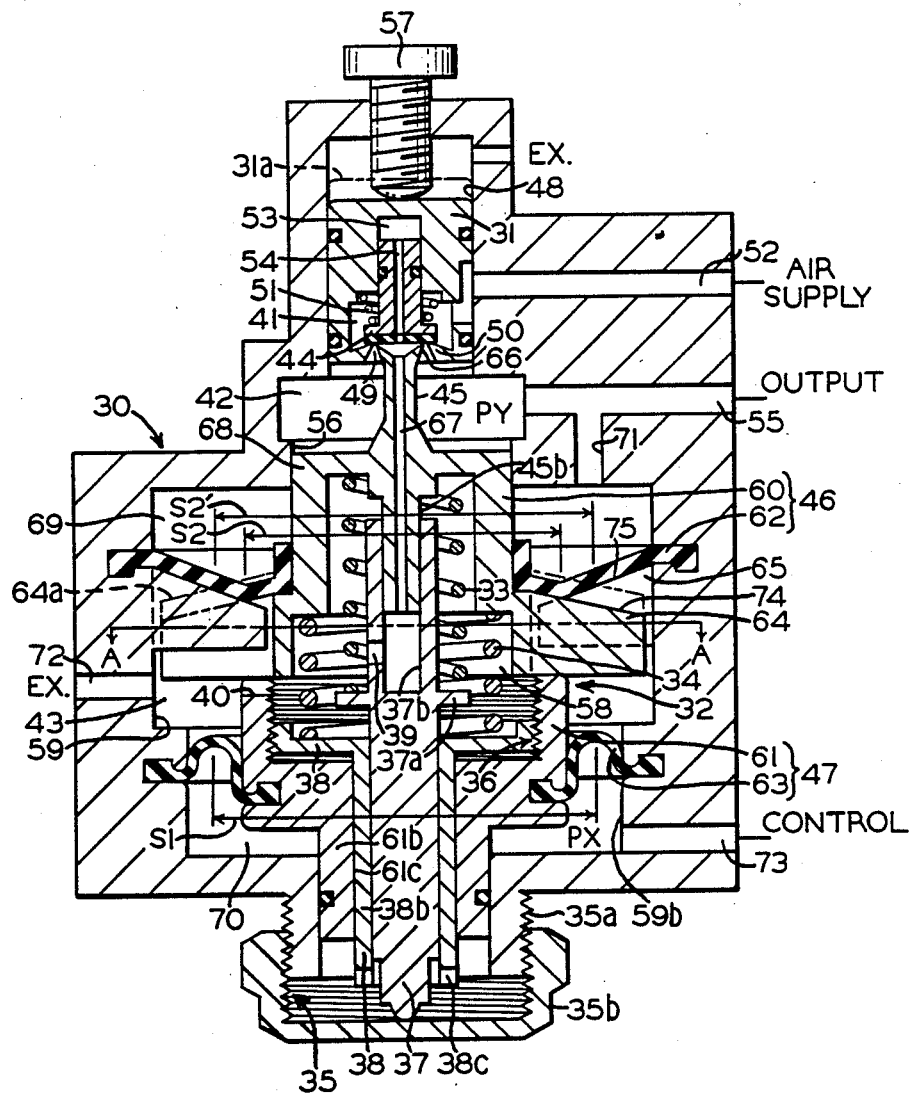
FIG. 1 is a vertical cross-sectional frontal view showing the details of the pressure control valve structure of one embodiment of the present invention.
Figure 2:
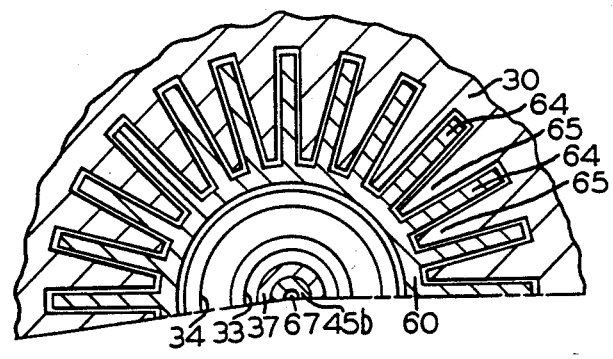
FIG. 2 is a partial cross-sectional view taken along line A—A of FIG. 1.

Referring now to the drawings, and in particular to FIGS. 1 and 2, there is shown one preferred embodiment which will be presently explained. As shown in FIGS. 1 and 2 the load dependent valve includes a middle body member 31 and reciprocating piston 32 located on inside the main valve body 30. As shown in FIG. 1, an air supply chamber 41 is formed within the lower end of the middle body member 31. As shown, an output chamber 42 is formed in the upper end of the main valve body 30. It will be seen that an exhaust chamber 43 is formed in the intermediate portion in the main valve body 30. The air supply valve 44 is located in the center bore formed in the middle body member 31. An exhaust valve rod 45 is integrally formed on the upper end of piston member 32 and includes a flared rim or valve tip 66 disposed adjacent the supply valve 44. As shown, a balance piston 46 is located at the upper intermediate port of piston 32 and a control piston 47 is located at the lower intermediate portion of piston 32. A first biasing spring 33 urges the piston 32 upwardly while a second biasing spring 34 also urges the piston 32 upwardly. A first spring adjusting mechanism 35 is cooperatively associated with the first spring 33 and a second spring adjusting mechanism is cooperatively associated with the second spring 34.

The middle body member 31 has an external shape which takes the form of a short cylinder and which slidably fits in the inner center bore 48 formed in the upper portion of the main valve body 30. Thus, as shown in FIG. 1, the member 31 can move up and down in bore 48. As noted above, the middle body member 31 includes an air supply chamber 41 and a valve seat 50 is formed therein which leads to an air supply passage 49. On the inside of the air supply chamber 41, the air supply valve 44 is biased downwardly by a valve spring 51 toward the seat 50. The air supply chamber 41 is connected to a suitable source of compressed air via the passage 52 which is formed in the right side of the main valve body 30. The air supply valve 44 has a central bore 54 which is connected to the back vent chamber 53 formed above the air supply valve. The lower end of bore 54 terminates near the air supply hole 49 which is below the valve 44. Thus, the lower end of the middle body member 31 leads into the output chamber 42. It will be appreciated that the output chamber 42 may, in turn, be connected to the brake cylinder of the brake system via the outlet passage 55 formed in the right side of the main valve body 30. A vent space is located above the middle body member 31, namely, the upper end of the inner hole 48 is opened to the atmosphere via port EX.

An adjustable screw 57 is threaded into the top of the main valve body 30 for adjusting the position of the middle body member 31. The screw 57 extends through a threaded hole formed in the main valve body 30 and enters the inside of the inner bore 48 so that its tip touches the top of the middle body member 31. The middle body member 31 is forced against the inner tip of the screw 57 by the output air pressure in chamber 42 acts on the underside of the middle body member 31 so that it is moved upwardly. A desired position of the member 31 is established by rotating the screw 57 from the outside which operates in conjunction with the input and output pressures.

The piston member 32 is located in the inner bore 59 formed in the inside of the intermediate portion of the main valve body 30 as shown in FIG. 1. The piston 32 consists of an upper balance piston main body 60 which is integrally connected to the lower end of the exhaust valve rod 45 and a lower control piston main body 6!. Thus, the balance piston 46 is made up of the upper piston body and the piston diaphragm 62 while the control piston 47 is made up of the piston diaphragm 63 and the lower piston body 61. A plurality of first radially extending fins 64 are carried by piston member 32 while a plurality of second radially extending fins 63 are carried by the inner bore wall 59. The fins 64 are interleaved with the fins 65 as shown in FIG. 2.

The exhaust valve rod 45 has a flanged rim or valve tip 66 which faces the air supply valve 44 from the output chamber 42. The diameter of the valve tip 66 is approximately the same as the inside diameter of the back vent chamber 53 in which the air supply valve 44 slides. As shown, the rod 45 has an exhaust bore 67 formed therethrough. One end of the exhaust bore 67 is adjacent to the valve tip 66 while the other end opens into the exhaust chamber 43.

The lower end of rod 45 is integrally formed with the lower guide portion 68 so that it moves together with the exhaust valve rod 45. The direction of movement is in a vertical direction as shown in FIG. 1. Thus, the exhaust valve rod 45 and the portion 68 of the balance piston main body 60 fits in a central bore 56 of the main valve body 30 so that it can freely slide therein. The inner periphery of the control diaphragm 63 is fixedly secured to the circumference of the control piston 61 while the outer periphery is fixedly secured to the wall of the lower inner bore 59b of the main valve body 30. The inner periphery of the balance piston diaphragm 62 is fixedly secured to the circumference of the balance piston 60 while the outer periphery of the balance piston diaphragm 62 is fixedly secured to the wall of the upper inner bore 59. These diaphragms 62 and 63 are made preferably of a suitable rubber type material. Thus, the inside of the upper inner bore 59 can be divided into the balance chamber 69 and the exhaust chamber 43 while the lower inner bore 59a defines a control chamber 70. The balance chamber 69 is connected to the output chamber 42 by a passageway 71. The exhaust chamber 43 is equipped with the exhaust port 72 formed in the left side wall of the main valve body 30. The control chamber 70 is equipped with the control port 73 through which the control air pressure is introduced and which is formed in the right wall of the main valve body 30. As shown in FIG. 2, the first fins 64 extend in a radial direction from the circumference of the balance main piston body 60 into the part in the exhaust chamber 43. The outer edge of fins 64 terminate near the inner surface of the inner bore 59. The upper edges 74 on the side adjacent the diaphragm 62 form a straight line surface which is slanted downwardly, as shown in FIG. 1. The second fins 65 extend from the circumference of the inner bore 59 of the main valve body 30, as shown in FIG. 2. The fins 65 are interleaved between the first fins 64. The upper edges 75 on the side adjacent the diaphragm 62 form a straight line surface which is slanted downwardly. The first slanted surface which is formed by the upper edges 74 of the first fins 64 intersects with the second slanted surface which is formed by the upper edges 75 of the second fins 65 between the balance main piston body 60 and the circumferential wall of the inner bore 59. The intersection forms a circular line which is concentric with the periphery of the balance piston main body 60. The diameter of the circle of the intersecting line varies as the main piston body 60 moves in the axial direction.

It is understood that the balance main piston body 60 and the control main piston body 61 may be separate vertically adjacent members, and a spring chamber 58 is formed therein. A first and second biasing springs 33 and 34 are installed and caged in the spring chamber 58.

The first biasing spring 33 is a coil compression spring having the uppermost coil contacting the upper wall of the balance piston main body 60 and having the lowermost coil contacting a first spring retaining flange 37a formed on the intermediate portion of the first spring retainer. The first spring retainer 37 is rod shaped and has an inner bore hole 37b formed in the upper half thereof. The lower portion 45b of the exhaust valve rod 45 is adapted to fit into the inner bore hole 37b to freely slide therein. The lower half of the first spring retainer 37 extends downwardly toward the bottom of the main valve body 30.

The second spring 34 is also a coil compression spring having a diameter greater than that of the first compression spring and which is disposed outside of the first coil spring 33. The uppermost coil of the second compression spring 34 contacts the balance piston main body 60, and the lowermost coil of the second spring 34 contacts the second spring retainer 38. The second spring retainer 38 includes an upper flange shaped retainer 38a located inside of the control main piston body 61 and includes central hollow cylinder portion 38b which extends downwardly from flange 38a. The bottom half of the first spring retainer 37 fits in the inner opening of the hollow cylinder 38b so that it can slide freely and the lower end of the hollow cylinder 38b extends below the exterior of the valve main body 30. The control main piston body 61 has a depending sleeve portion 61b located at its lower end, and this sleeve 61b fits into the depending tubular portion of the main valve body 30 in an air tight manner. The hollow cylinder 38b passes through the inner bore 61c formed in the sleeve portion 61b.

The first spring adjusting mechanism 35 includes an externally threaded portion 35a which is formed on the sleeve portion of the main valve body 30. The internally threaded cap nut 35b is screwed onto the externally threaded portion 35a. The lowermost end of the first spring retainer 37 contacts the cap nut 35b so that the first spring retainer 37 moves up and down when the cap nut 35b is turned. Thus, the compression force of the first biasing spring 33 can be varied. Therefore, the force of the first biasing spring 33 in relation to the balance piston 46 can be appropriately adjusted.

The second spring adjusting mechanism 36 includes an externally threaded portion formed on the circumference of the flange retainer 38a of the second spring retainer 38. An internally threaded portion is formed on the inside wall of the control main piston body 61. Thus, the two parts of the second spring retainer 38 are screw threaded together. As shown in FIG. 1, a slotted cut-out keeway 38c is formed on the lower extremity of the second spring retainer 38 for accommodating a spanner wrench or the like. When the second spring retainer 38 is rotated using the cut-out keyway 38c, the lower support of the second biasing spring 34 on the side of the control piston main body 61 is caused to move up or down in relation to the control piston main body 61 so that the compression force of the second biasing spring 34 can be adjusted when the balance piston 46 and the control piston 47 are in a certain selected position.

As shown in FIG. 1, a through hole 39 is drilled into bore hole 37b and a through slot 40 is sleeve portion 61b so that the exhaust hole 67 is fluidly connected to the exhaust chamber 43.

In the load dependent valve constructed according to the present invention, the effective area of the control piston 47 which consists of the control main piston body 61 and the control piston diaphragm 63 is shown as diameter S1 while the effective area of the balance piston 46 which consists of the balance piston main body 60 and the diaphragm 62, is shown as diameter S2. Thus, in an overlap position the output air pressure PY in the output chamber 42 and the air spring pressure PX which appears in the control chamber 70, is stabilized since the output chamber 42 is blocked from the air supply chamber 41 and from the exhaust chamber 43 and the condition is represented by the following equation:

pi $PY = (S1/S2) \times PX$

Here, the effective area S2 of the balance piston 46 is the area where the cross-sectional area of the valve tip 66 of the exhaust valve rod 45 is subtracted from the area circumscribed by the circle of the intersection line. In other words, the diaphragm 62 is in contact with the first fins 64 which extend from the balance piston main body 60 inside the circle of the intersection line. Inside this circle, the force of the pressure in the balance chamber 69 can be transferred to the balance main piston body 60. Outside this circle however, it is in contact with the second fins 65 which protrude from the main valve body 30, and the force of the pressure in the balance chamber 69 is transmitted to the side of the main valve body 30 and does not effect the balance main piston body 60.

In this present load dependent valve the effective area S2 of the balance piston 46 can be varied by changing the position of the middle body member 31. In other words, the position of the middle body member 31 can be changed by turning the screw 57 vertically so that member 31 moves. For example, the screw 57 is turned counterclockwise, the middle body member 31 moves upwardly. The top of the middle body member 31 is still attached to the lower tip of the screw 57 by the force of the air pressure in the output chamber 42. If the middle body member 31 is displaced to a position indicated by the phantom line 31a the valve tip 66 of the exhaust valve rod 45 also rises so that the balance main piston body 60 which is integral with the exhaust valve rod 45 is also raised and the control main piston body 61 which is in a fixed relation with the balance piston main body also rises to maintain their relationship. Therefore, in the overlap state after the position of the middle body member 31 is changed, the diameter of the circle of the intersection line related to the effective area S2 of the balance piston 46 becomes larger. That is the new effective area S2, is larger than the previous effective area S2. As shown in FIG. 1 the position of the first fins in the overlap condition after the position of the middle body member changes is indicated by character 64b.

The change of the effective area of the balance piston 46 from S2 to S2', results in the change of the effective area ratio from S1/S2 to S1/S2'. Thus, the characteristic of the output air pressure PY to the command air pressure PX is changed proportionally. In other words, the slope of the curve shown in FIG. 5 can be changed.

Figure 5:
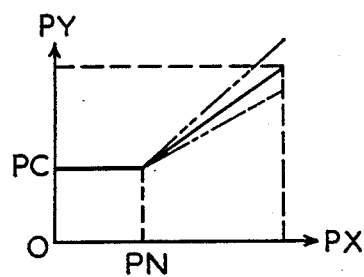
FIG. 5 is a graphical representation of the operation of the valve of FIG. 4.

In addition, in this load dependent valve, the minimum output air pressure PC indicated in FIG. 5 can be varied by adjusting the force of the first biasing spring 33. In other words, the spring 33 should be adjusted so that the output air pressure PY becomes equal to the air pressure PC when the air spring pressure PX is 0.

In addition, in this load dependent valve, the empty car air spring pressure PN shown in FIG. 5 can be set by adjusting the force of the second biasing spring 34. In other words, the force of the second biasing spring 34 should be adjusted so that the diaphragm 63 separates from the lower surface of the control piston main body 61 rises when the control piston 47 rises so that the air spring pressure PX exceeds the empty car air spring pressure PN.

Now when the minimum output air pressure PC and the empty car air spring pressure PN are set and when the characteristic of the output air pressure PY to the air spring pressure PX exceeds the empty car air spring pressure PN is set to the desired level the air spring pressure PX becomes 0. This may result because of the failure of the air spring or for some other reason, or becomes lower than the empty car air spring pressure PN. Thus, the output air pressure PY will not become lower than the minimum output air pressure PC because of the action of the first biasing spring 33. In addition, when the air spring pressure PX is acting normally and when the air spring pressure PX exceeds the empty car air spring pressure PN, the desired output air pressure PY can be achieved to the preset characteristic by the moving of the middle body member 31. In other words, it assumes the same characteristic as that illustrated in FIG. 5.

Figure 3:
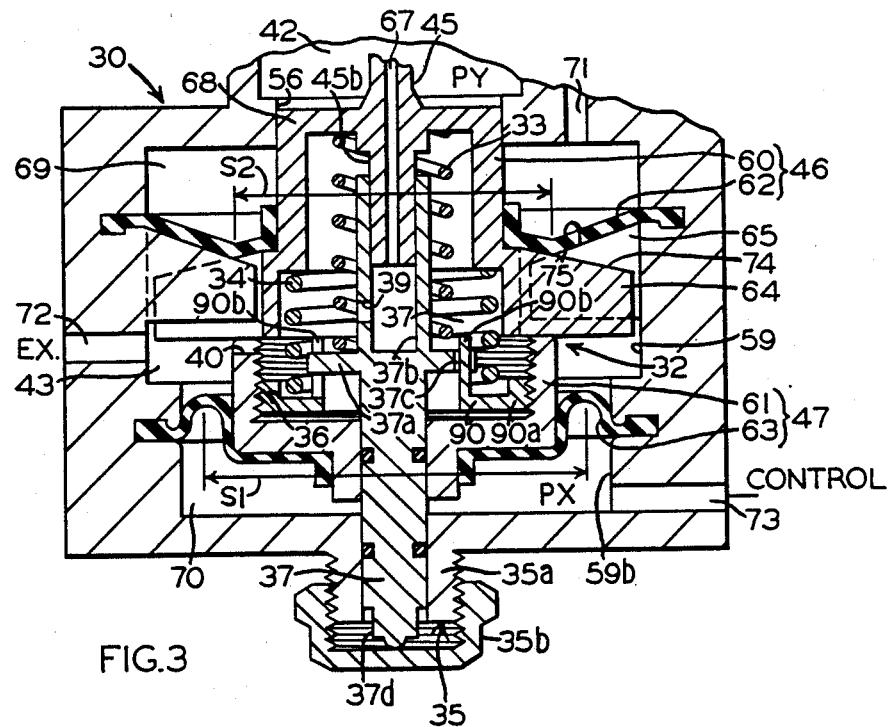
FIG. 3 is a vertical cross-sectional frontal view of another embodiment of the load dependent control valve.
Figure 4:
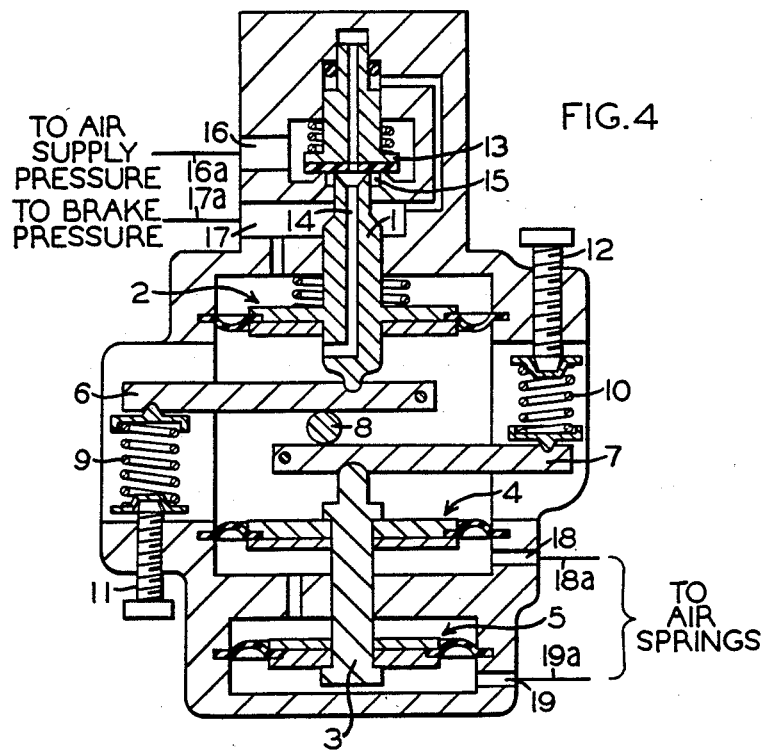
FIG. 4 is a vertical cross-sectional frontal view of a load dependent valve of one embodiment of the prior art.

Referring now to FIG. 3, there is shown a second embodiment of the present invention will now be described. The basic difference between the second embodiment and the first embodiment resides in the second spring adjustor 90. It will be appreciated that other elements and structure of the second embodiment are the same as those shown and described in FIGS. 1 and 2, and the no additional detailed description of the same will follow for convenience purposes.

As shown in FIG. 3, the second spring retainer 90 includes a plurality of upwardly extending pins 90b which are connected to a flange 90a. The lowermost coil of the second spring 34 contacts and engages the upper surface of the flange rim 90a. The pins 90b fit through opening 37c which are formed on the outer rim of the enlarged circumference of the flange portion 37a of the first spring retainer 37. A hexagonal or square headed portion 37d is formed on the lower end of the first spring retainer 37. This structure provides that only the lower part of the first spring retainer 37 extends through the wall of the main valve body 30. The circumference of the flange portion 90a meshes with the control main piston body 61 which is the same as the first embodiment. When the first spring retainer 37 is rotated using a suitable wrench that engages the head 37d, the second spring retainer 90 also rotates via the pins 90a and openings 37c. Thus, the compressive force of the second spring 34 is adjusted.

The elements which are the same as those in the first embodiment have been designated with the same numbers, and as noted above a detailed explanation is omitted for the sake of convenience. In the load dependent valve of this second embodiment, the characteristic shown in FIG. 5 can be obtained by pre-setting each pressure PC, PN in the same manner as in the first embodiment.

In the above-mentioned embodiment, the upper edges 74 and 75 of the first and second fins 65 adjacent the diaphragm 62 are also inclined downward in the direction from which the fins extend. However, it is understood that one of the upper edges 74 or 75 of the radially extending fins may be horizontal, namely, in direction perpendicular to the axial line of the main piston. In other words, the effective area of the balance piston 46 in the overlap condition can be varied by changing the position of the middle body member 31 so that the effective area ratio of the control piston 47 and the balance piston 46 can be changed.

In addition, in the structure of the second embodiment the fins are located on the balance piston main body 60 and the corresponding valve main body 30. However, in the case of the simplified load dependent valve in which the air spring pressure is the only one, the fins which are equivalent to the first fin 64 and the second fin 65 can be located on only the control piston 47 or on the sides of both pistons. In this case also, the effective area ratio of the control piston 47 and balance piston 46 can be changed in the same manner.

Both the first embodiment and the second embodiment are shown with only one air spring pressure, but in general, two or more air spring pressures can be effectively used like other models.

As described in this invention, the position of the balance piston and the control piston in overlap condition, the main valve body can be varied simply by changing the position of the middle body member so that the position relation of the first fins and the second fins is changed by such a displacement. Thus, the effective area ratio of the control piston and the balance piston can be changed by this movement, and therefore, the characteristic of the output air pressure to the air spring pressure can be changed without replacing the piston as was the case in the prior art. Further, there is no need of using a lever arrangement which causes problems after being used for long periods of time. Therefore, the service life of the present invention can be improved compared with the arrangements of the prior art. When compared with the existing models using the lever mechanism the load dependent valve of this invention it is possible to place the control force and the balance force face along the same axial direction since the balance piston and the control piston are situated on the same axial line. Thus, some problems such as the fact that a force other than in the axial direction acts on the piston in the one which uses the lever mechanism, can be solved. Therefore, the reduction in sensitivity or the decrease in response ability after being used for a long period of time is dramatically improved.

The following is a nomenclature list of components or elements shown and disclosed in the drawings and specification of the subject invention:

30. main valve body
31. middle body member
31a. phantom line
32. piston member
33. first biasing spring
34. second biasing spring
35. first spring adjusting mechanism
35a. externally threaded portion
35b. internally threaded cap nut
36. second spring adjusting mechanism
37. first spring retainer
37a. retaining flange
37b. inner bore hole
37c. openings
37d. head portion
38. second spring retainer
38a. flange shaped retainer
38b. hollow cylinder
38c. slotted cut-out keyway
39. through hole
40. through slot
41. air supply chamber
42. output chamber 43. exhaust chamber
44. air supply valve
45. exhaust valve rod
45b. lower portion
46. balance piston
47. control piston
48. inner bore
49. air supply passage
50. valve seat
51. valve spring
52. air supply passage
53. back vent chamber
54. central bore
55. outlet passage
56. central bore
57. screw (position adjusting mechanism)
58. spring chamber
59. inner bore
59b. lower inner bore
60. balance piston main body
61. control piston main body
61b. depending sleeve portion
61c. diaphragm
62. balance piston
63. control piston diaphragm
64. first fins
65. second fins
66. valve tip
67. exhaust bore
68. lower guide portion
69. balance chamber
70. command chamber
71. passageway
72. exhaust port
73. control port
74. upper edges
75. upper edges
75a. upper edge
90. second spring retainer
90a. flange rim
90b. flange pins Thus, the present invention has been described in such full, clear, concise and exact terms as to enable any person skilled in the art to which it pertains to make and use the same, and having set forth the best mode contemplated of carrying out this invention. I state that the subject matter, which I regard as being my invention, is particularly pointed out and distinctly asserted in what is claimed. It will be understood that variations, modifications, equivalents and substitutions for components of the above specifically-described embodiment of the invention may be made by those skilled in the art without departing from the spirit and scope of the invention as set forth in the appended claims.

I claim:

1. A load dependent valve for railway cars comprising, a first spring having one end contacting a balance piston and having the other end supported by a first spring retainer which extends through a center part of a control piston, a second spring having one end contacting the balance piston side and having the other end supported by a second spring retainer, a first spring adjusting mechanism disposed between the first spring retainer and the side of a main valve body for adjusting the compressive force of the first spring, and a second spring adjusting mechanism disposed between the second spring retainer and the side of the control piston for adjusting the compressive force of the second spring, an air supply chamber connected to a compressed air source, an output chamber connected to an output port, an exhaust chamber which opens to the atmosphere, a valve seat disposed in an air supply passage which is connected between the air supply chamber and the output chamber on the adjacent side of the air supply chamber, an air supply valve is biased to seat on the valve seat, an exhaust valve rod having a valve tip which faces the air supply valve and which fits the air supply passage and has an exhaust air bore, one end of which opens at the valve tip and the other end of which opens at the exhaust chamber, said control piston including a control piston diaphragm having an inner edge which is fixed to the main valve body and having an outer edge which is fixed to the control piston main body, and which generates a force to move the exhaust valve rod in the direction of the air supply valve when it receives a control air pressure, said balance piston including a balance piston diaphragm having an inner edge which is fixed to the main valve body and having an outer edge which is fixed to the balance piston main body and which receives the air pressure from the output chamber, and generates the balance force against the force, a middle body member forming the air supply chamber, air supply passage valve seat, and the air supply valve, a position adjusting mechanism by which the middle body member can be moved in the direction of movement of the exhaust valve rod and also which can be fixed in the moved position, a plurality of first fins which are fixed around the piston main body on the low pressure side along the direction of movement facing its upper edges to the diaphragm of the same piston, while the side opposite to that receiving the air pressure of at least one piston of the two pistons is set at a pressure lower than the minimum value of the air pressure, a plurality of second fins which are located in the main valve body and which are placed between the first fins, and in which the first surface which connects the upper edges of the first fins on the side of the diaphragm intersects with the second surface which connects the upper edges of the second fins on the side of the diaphragm.

2. The load dependent valve as defined in claim 1, wherein the position adjust mechanism includes a threaded screw which can be rotated by hand.

3. The load dependent valve as defined in claim 1, wherein the upper edges of the plurality of the first and second fins are slanted outwardly and downwardly.

4. The load dependent valve as defined in claim 2, wherein the thread screw has an inner tip which engages the middle body member.

5. The load dependent valve as defined in claim 1, wherein the first spring adjusting mechanism includes a rotatable threaded cap nut.

6. The load dependent valve as defined in claim 1, wherein the second spring adjusting mechanism includes a rotatable tubular member.

* * * * *